(12) United States Patent
Ehrsam et al.

(10) Patent No.: US 9,995,285 B2
(45) Date of Patent: Jun. 12, 2018

(54) METHOD FOR OPERATING A SOLAR THERMAL POWER SYSTEM WITH AN ECONOMIZER RECIRCULATION LINE

(71) Applicant: ALSTOM Technology Ltd., Baden (CH)

(72) Inventors: Andreas Ehrsam, Ennetbaden (CH); Enrico Conte, Schliern b. Koeniz (CH)

(73) Assignee: ALSTOM Technology Ltd., Baden (CH)

( * ) Notice: Subject to any disclaimer, the term of this patent is extended or adjusted under 35 U.S.C. 154(b) by 0 days. days.

(21) Appl. No.: 15/628,130

(22) Filed: Jun. 20, 2017

(65) Prior Publication Data

US 2017/0284378 A1    Oct. 5, 2017

Related U.S. Application Data

(62) Division of application No. 14/625,818, filed on Feb. 19, 2015.

(30) Foreign Application Priority Data

Feb. 24, 2014    (EP) .................................. 14156348

(51) Int. Cl.
*F01K 13/02*    (2006.01)
*F03G 6/06*    (2006.01)
(Continued)

(52) U.S. Cl.
CPC ............... *F03G 6/003* (2013.01); *F01K 1/14* (2013.01); *F01K 13/02* (2013.01); *F03G 6/067* (2013.01);
(Continued)

(58) Field of Classification Search
CPC . F03G 6/00; F03G 6/003; F03G 6/005; F03G 6/06; F03G 6/065; F03G 6/067;
(Continued)

(56) References Cited

U.S. PATENT DOCUMENTS 3,756,023 A    9/1973   Berman
4,465,027 A *  8/1984   Steinegger ......... B01D 19/0068
                                              122/406.4

(Continued)

FOREIGN PATENT DOCUMENTS

DE         36 25 062 A1    2/1988
DE    10 2010 041 903 A1    4/2012
(Continued)

OTHER PUBLICATIONS

PCT Search Report, dated Apr. 28, 2016.

*Primary Examiner* — Laert Dounis
(74) *Attorney, Agent, or Firm* — Dority & Manning, P.A.

(57) ABSTRACT

A solar thermal power system includes a solar receiver, and a thermal energy storage arrangement having thermal energy storage fluid to be circulated through the solar receiver to store thermal energy. The system includes a multistage steam turbine operable on variable pressure steam generated by a steam generator arrangement, by utilizing the thermal energy storage fluid. The arrangement includes an economizer section, an evaporator section, and a superheater section communicably configured to utilize the heat of the hot thermal energy storage fluid to generate and supply the variable pressure steam to the turbine. The system includes a recirculation line configured around the economizer section to recirculate the heated water to an inlet of the economizer section, increasing pressure range of the variable pressure steam in the arrangement.

7 Claims, 5 Drawing Sheets

(51) Int. Cl.
  *F03G 6/00* (2006.01)
  *F01K 1/14* (2006.01)
  *F22B 1/00* (2006.01)
  *F22D 1/00* (2006.01)

(52) U.S. Cl.
  CPC ............... *F22B 1/006* (2013.01); *F22D 1/00* (2013.01); *Y02E 10/46* (2013.01)

(58) Field of Classification Search
  CPC ..... F03G 2006/008; Y02E 10/40–10/47; F24J 2/4632; F24J 2/4634; F22B 1/006; F22B 1/06; F22D 11/04
  USPC ............................................. 60/641.8–641.15
  See application file for complete search history.

(56) References Cited

U.S. PATENT DOCUMENTS

| | | | | |
|---|---|---|---|---|
| 4,841,722 A | * | 6/1989 | Bjorge | ............... F22D 1/40 60/39.182 |
| 5,419,285 A | | 5/1995 | Gurevich et al. | |
| 5,904,039 A | * | 5/1999 | Bruckner | ............ B01D 19/0047 60/39.182 |
| 6,089,013 A | | 7/2000 | Bruckner | |
| 6,460,490 B1 | * | 10/2002 | Knauss | ................. F22B 1/1815 122/1 C |
| 2008/0034757 A1 | | 2/2008 | Skowronski et al. | |
| 2012/0255300 A1 | * | 10/2012 | Birnbaum | ............... F03G 6/065 60/641.8 |
| 2013/0091842 A1 | * | 4/2013 | Kaufmann | .............. F01K 13/02 60/641.8 |
| 2013/0186089 A1 | * | 7/2013 | Bruckner | ................... F01K 7/22 60/641.11 |
| 2013/0192226 A1 | * | 8/2013 | Stettenheim | ............. F24J 2/055 60/641.15 |
| 2015/0167647 A1 | * | 6/2015 | Gulen | ...................... F03G 6/06 60/641.11 |

FOREIGN PATENT DOCUMENTS

| | | | |
|---|---|---|---|
| DE | 10 2011 004 280 A1 | 8/2012 | |
| DE | 10 2011 007 370 A1 | 10/2012 | |
| EP | 1 898 056 | 3/2008 | |
| EP | 2 037 192 A1 | 3/2009 | |
| WO | WO 2012/041989 A1 | 4/2012 | |
| WO | WO 2012110330 A2 * | 8/2012 | ............. F22B 1/006 |
| WO | WO 2013/087949 A1 | 6/2013 | |

* cited by examiner

METHOD FOR OPERATING A SOLAR THERMAL POWER SYSTEM WITH AN ECONOMIZER RECIRCULATION LINE

CROSS-REFERENCE TO RELATED APPLICATIONS

The present application is a Divisional application of U.S. application Ser. No. 14/625,818 filed Feb. 19, 2015, which claims priority to European application 14156348.6 filed Feb. 24, 2014, the contents of which are hereby incorporated in its entirety.

TECHNICAL FIELD

The present disclosure generally relates to the field of concentrated solar power, and more particularly, to a concentrated solar thermal power plant with thermal energy storage fluid that utilizes concentrated solar power to store heat energy, and utilize the stored heat energy to generate electricity.

BACKGROUND

A solar thermal power plant based on Direct Steam Central Receiver (DSCR) includes a large field of heliostats and a solar receiver placed on a tower of substantial height. The heliostats focus direct sunlight on to the solar receiver to produce steam to be utilized to run a steam turbine from producing electricity. Typically, the solar thermal power plant operates on a daily cycle, during clear sunlight hours, while shutting down in nights or in cloudy seasons. However, if the solar thermal power plant is to meet increasing electricity demand, it needs to be operable irrespective of the availability of solar light, i.e. in nights or in cloudy seasons. A realization of such a solar thermal power plant generates a requirement of storing solar thermal energy during day times and utilizing thereto in nights or in cloudy seasons. For such requirement, a central receiver including a solar energy storage fluid, such as molten salt, is generally used. The central receiver with molten salt is generally known as Molten Salt Central Receiver (MSCR).

In a typical MSCR system a MSCR, hot and cold storage tanks and a Molten Salt Steam Generator (MSSG) cycle are arranged to utilize the solar energy to produce electricity. In such arrangement, the molten salt fluid heated at the MSCR is stored in the hot storage tank, at temperature of about 565° C., and after thermal energy thereof is being utilized by the MSSG cycle, it is stored in the cold storage tank, at temperature of about 290° C., from where it is further sent to the MSCR to be reheated. The MSSG cycle includes: a steam generator arrangement generally having an economizer, an evaporator and a superheater configured together; a reheat and a multi-stage turbine. The steam generator arrangement utilizes the heat of the hot molten salt and converts feedwater from a feedwater tank in to steam and send it to the multi-stage turbine for the conversion of heat to electricity through a generator. Further, the steam may be reheated in the reheater utilizing the hot molten salt to supply reheated steam for further stage of the multi-stage turbine. Various steam generator technologies may be applied as such for the said purpose. The economizer, evaporator and superheater may be separated in dedicated components or all the three sections may be combined in one single component (known as once-through steam generator). In case of an arrangement with separate components, the evaporator may include one body (often referred to as kettle boiler) or divided into an evaporator and a steam drum for steam separation. Furthermore, each section, like the economizer, evaporator and superheater may be divided into multiple bodies, in series or in parallel.

Irrespective of such varying steam generator technologies, the pressure of steam in the MSSG cycle are generally limited by a so-called pinch limitation in the MSSG cycle, typically at or lower than 115 bars. The pinch limitation in the MSSG is determined by two important factors. Firstly, feedwater temperature shall need to be maintained above a minimum level, typically 240° C., to eliminate the risk of freezing of the molten salt inside of a heat exchanger (economizer, evaporator, superheater (and if included reheat), may be simply be referred to as 'heat exchange'). Secondly, the temperature of the molten salt leaving the MSSG shall be kept as low as possibly allowed for safe operation of the salt, typically at 290° C. An increase of this outlet temperature decreases the thermal storage capacity, and thus requires additional quantity of salt for the same amount of stored energy. Under these two conditions, the water is heated up in the economizer and starts evaporating at a pressure which is determined by the heat balance of the system, typically at 115 bars or lower. The limitation of the steam pressure resulting from the above mentioned factors has a negative impact on the efficiency of the power plant.

SUMMARY

The present disclosure discloses a solar thermal power system that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to describe a solar thermal power system that may be capable of increasing steam pressure in a steam generator arrangement while preventing freezing of the molten salt improving the efficiency of solar thermal power system.

In one aspect of the present disclosure, a solar thermal power system is described to achieve one or more objects of the present disclosure. The solar thermal power system includes: a solar receiver, a thermal energy storage arrangement, a multistage steam turbine, a steam generator arrangement and a recirculation line. The thermal energy storage arrangement has thermal energy storage fluid to be circulated through the solar receiver to store thermal energy. The multistage steam turbine is configured to be operable on variable pressure steam generated from water supplied from a feedwater supply by utilizing the thermal energy storage fluid. Further, the steam generator arrangement includes an economizer section, an evaporator section, and a superheater section communicably configured to utilize the heat of the hot thermal energy storage fluid at an entrance of the evaporator section to generate and supply the variable pressure steam to the superheater section and eventually to the multistage steam turbine. Further, the recirculation line is configured around the economizer section to recirculate the heated water to an inlet of the economizer section to increase heat load on the economizer section in turn increasing pressure range of the variable pressure steam in the steam generator arrangement, while maintaining the temperature of the thermal energy storage fluid at an inlet of the evaporator section and at an outlet of the economizer section, and the feedwater temperature to the economizer section at desired values. The recirculation line includes a pump to overcome the pressure drop from the outlet to the inlet of the economizer section. The increase of steam pressure increases efficiency of the power cycle, specifically 'Rankine power cycle'.

In one embodiment, the recirculation line is configured from an outlet of the economizer section to the inlet of the economizer section. In another embodiment, the recirculation line is configured from the evaporator section to the inlet of the economizer section. In further embodiment, the economizer section may include a steam drum, and in that embodiment the recirculation line may be configured from the steam drum to the inlet of the economizer section.

In an additional embodiment of the present disclosure, the solar thermal power system may further include a bypass line configured to bypass the economizer section to directly supply the water from the feedwater supply to the evaporator section.

The solar thermal power system in one embodiment may also include a reheat assembly configured to the steam generator arrangement to reheat the steam.

In one form, the thermal energy storage arrangement of the solar thermal power system includes first and second storage tanks. The first storage tank is adapted to store the hot thermal energy storage fluid. The second storage tank is adapted to store the cold thermal energy storage fluid. The thermal energy storage arrangement supplies the cold thermal energy storage fluid from the second storage tank to the solar receiver to be reheated.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION

For a thorough understanding of the present disclosure, reference is to be made to the following detailed description, including the appended claims, in connection with the above-described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms, such as "first," "second" and the like, herein do not denote any order, elevation or importance, but rather are used to distinguish one element from another. Further, the terms "a," "an," and "plurality" herein do not denote a limitation of quantity, but rather denote the presence of at least one of the referenced item.

Figure 1:
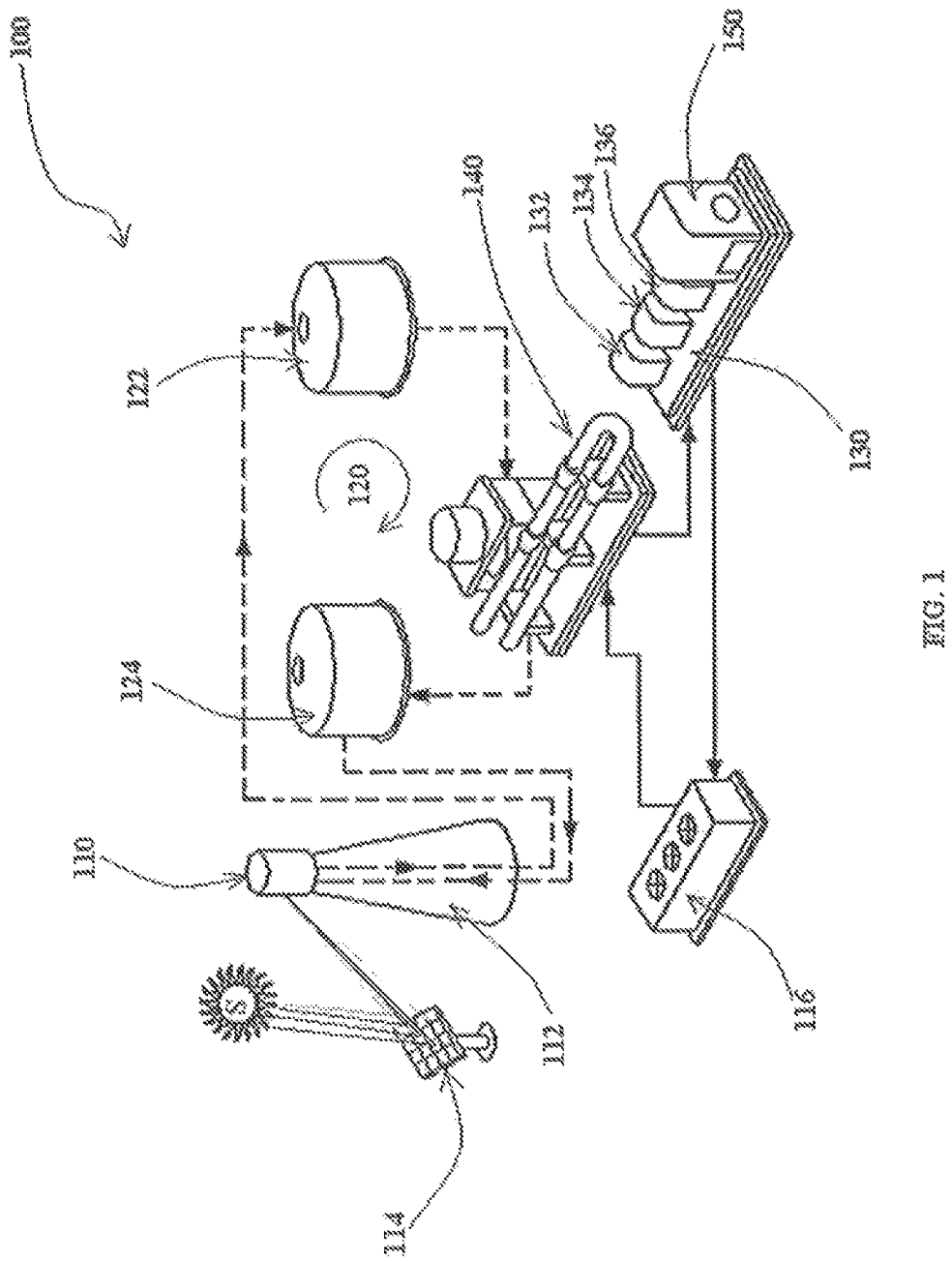
FIG. 1 illustrates overall view of a solar thermal power system, in accordance with one exemplary embodiment of the present disclosure.

Referring to FIG. 1, an example diagrammatic illustration of a solar thermal power system 100 is depicted in accordance with an exemplary embodiment of the present disclosure. The solar thermal power system 100 (hereinafter referred to as 'system 100') includes a solar receiver 110 that may be placed on a tower 112 of substantial height and surrounded by a large field of heliostats 114. The solar receiver 110 receives solar energy from the heliostats 114 to be heated, which is designed to direct the solar energy from the sun '5'. The system 100 further includes a thermal energy storage arrangement 120 (hereinafter referred to as 'thermal storage arrangement 120') (dotted lines) having a thermal energy storage fluid (hereinafter 'thermal storage fluid') to be circulated through the solar receiver 110 to store thermal energy therein. The thermal storage fluid may generally be a molten salt, a mixture of Sodium and Potassium Nitrates ($NaNO_3$ and $KNO_3$). However, without departing from the scope of the present disclosure, any other thermal storage fluid, such as other salt or liquid metal compositions, may be used as found suitable for the said purpose. The thermal storage arrangement 120 may include first and second storages tanks 122, 124. During day times, when solar energy is incident on the solar receiver 110 by the heliostats 114, the thermal storage fluid flowing there through is heated. The heated thermal storage fluid may, from the solar receiver 110, is supplied and stored in the first storage tank 122. While at nights, the stored heated thermal storage fluid in the first storage thank 122 is utilized to generate electrical power, and resultant cold thermal storage fluid may be supplied to be stored in the second storage tank 124. Further during times, the cold thermal storage fluid from the second storage tank 124 is supplied the solar receiver 110 to be reheated.

The system 100 further includes a multistage steam turbine 130, and a steam generator arrangement 140 to utilize heat of the thermal storage fluid of the thermal storage arrangement 120 for driving an electrical generator 150 to produce electrical power. The multistage steam turbine 130 may include a high pressure steam turbine 132, an intermediate pressure turbine 134 and a low pressure turbine 136, which may be adapted to be operable on a variable pressure steam generated by the steam generator arrangement 140, by utilizing the thermal storage fluid from the thermal storage arrangement 120. The steam generator arrangement 140 may receive water from a feedwater supply 116 via a pump at high pressure to generate and supply the variable pressure steam to the multistage steam turbine 130. Specifically, the high pressure feedwater is primarily converted into high pressure steam of desired pressure, preferably of 170 bars, and temperature of 545° C., by the thermal storage fluid from the thermal storage arrangement 120. In as much as the construction and arrangement of the system 100, various associated elements may be well-known to those skilled in the art, it is not deemed necessary for purposes of acquiring an understanding of the present disclosure that there be recited herein all of the constructional details and explanation thereof. Rather, it is deemed sufficient to simply note that as shown in FIGS. 1 to 5B, in the system 100, only those components are shown that are relevant for the description of various embodiments of the present disclosure.

Figure 2:
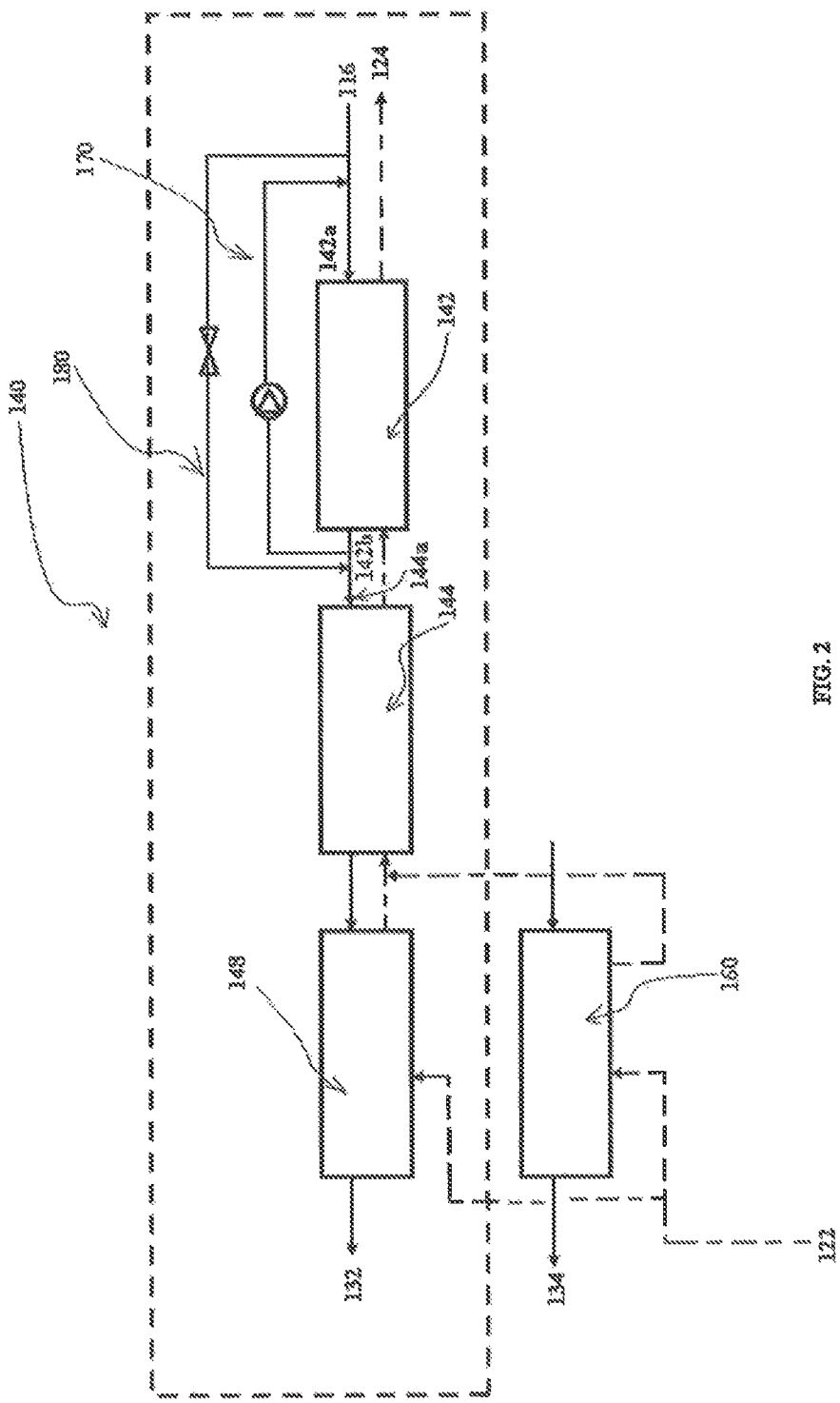
FIG. 2 is a diagrammatic illustration of a solar thermal power system, in accordance with one exemplary embodiment of the present disclosure.
Figure 3:
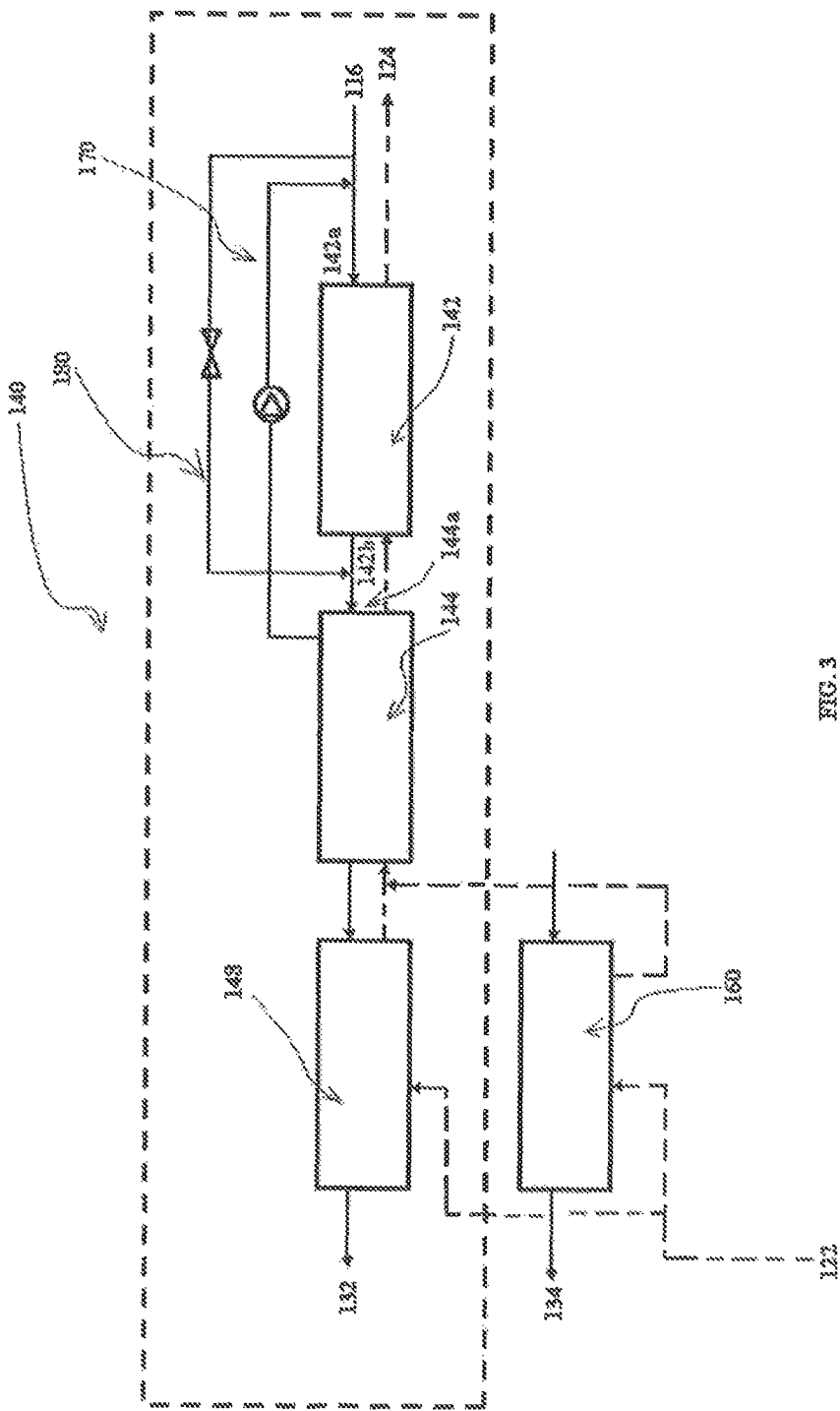
FIG. 3 is a diagrammatic illustration of a solar thermal power system, in accordance with another exemplary embodiment of the present disclosure.
Figure 4:
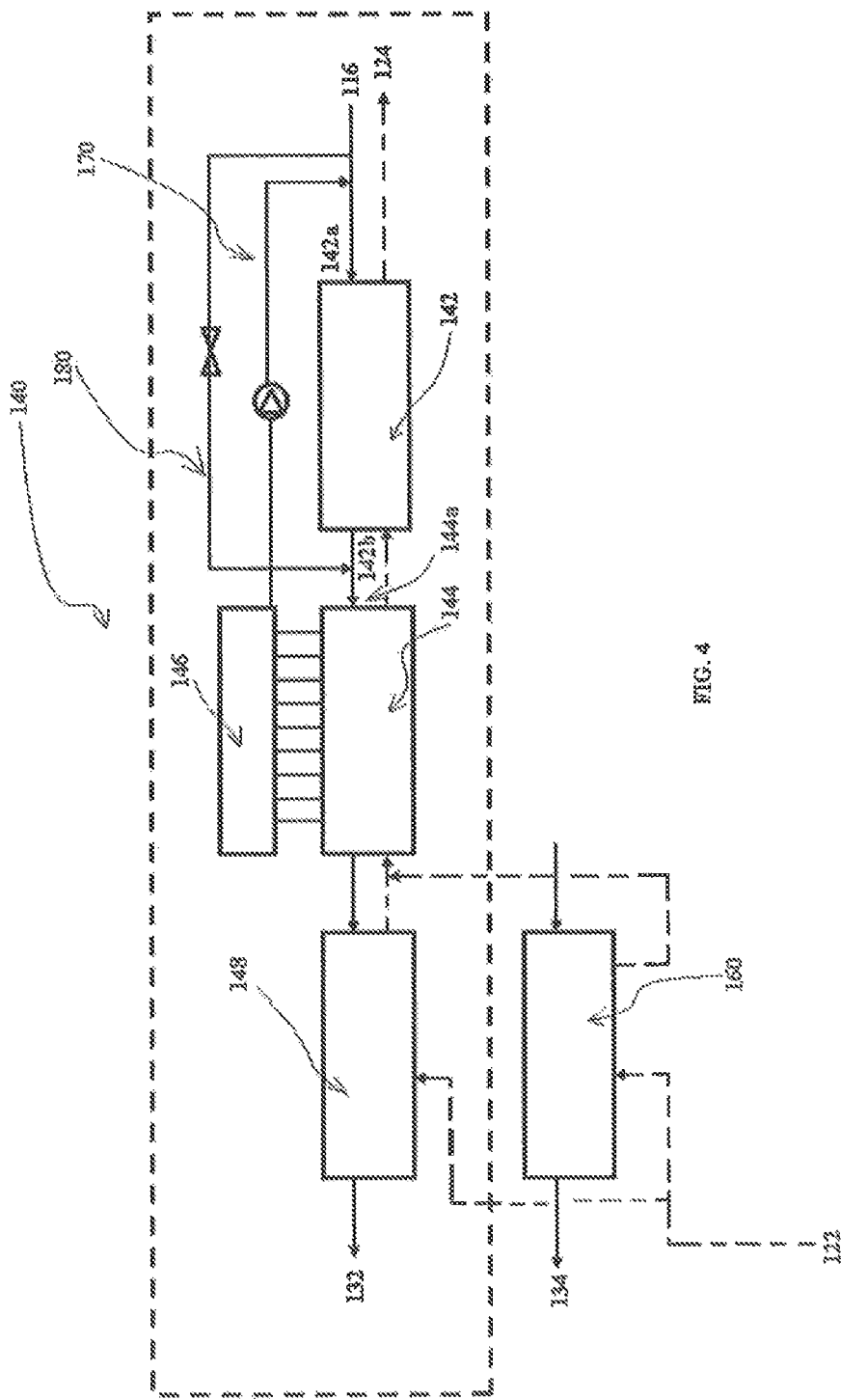
FIG. 4 is a diagrammatic illustration of a solar thermal power system where a steam drum is included, in accordance with another exemplary embodiment of the present disclosure.

Referring to FIGS. 2, 3 and 4, described in conjunction with FIG. 1, detailed line illustrations of the steam generator arrangement 140 are depicted in accordance with various embodiment of the present disclosure. As shown in FIGS. 2 and 3, the steam generator arrangement 140 (boundary by dotted lines) may include an economizer section 142, an evaporator section 144 and a superheater section 148 communicably configured to utilize the heat of the hot thermal storage fluid, at an entrance of the evaporator section 144, received from the first storage tank 122 to generate said high pressure steam from the water received from the feedwater supply 116. In FIGS. 2 and 3, the water-steam supply line is depicted as solid lines, while the hot thermal storage fluid supply line is depicted as dotted lines, in opposite arrow direction to the solid lines, for the sake of easy recognition. The hot thermal storage fluid results in cold thermal storage fluid upon its heat being utilized by the steam generator arrangement 140, and the resultant cold thermal storage fluid is being directly supplied to the second storage tank 124, from the steam generator arrangement 140 to be stored therein. The said high pressure steam is supplied to the superheater section 148 and eventually to the high pressure turbine 132 of the multistage steam turbine 130 to drive thereto. After supplying its energy, the steam may be released from a turbine stage downstream of the high pressure turbine 132.

The steam generator arrangement 140 may also include a reheat assembly 160. The hot thermal storage fluid from the first storage tank 122 may also be supplied to the steam generator arrangement 140, through the reheat assembly 160, to generate pressure steam, for example intermediate pressure steam, to supply to the intermediate pressure turbine 134. The reheat assembly 160 may also be utilized to reheat the pressure steam received from the turbine stage downstream of the high pressure turbine 132 by the hot thermal storage fluid. The steam from the intermediate pressure turbine 134 is supplied to the low pressure turbine 136 for driving the multistage steam turbine 130.

In whole of the above description about generation of the steam for smoothly and economically working of the system 100, without freezing of the thermal storage fluid and without increase of the salt outlet temperature, the steam pressure is limited by the heat balance of the system 100. This is because after the water is heated up to saturation temperature in the economizer section 142 of the steam generator arrangement 140, evaporation gets started, thereby naturally setting the evaporation pressure. The steam pressure has a direct impact on the efficiency of the steam cycle.

To improve the efficiency, the system 100 may be configured in such a manner where the steam pressure in the steam generator arrangement 140 may be freely increased while maintaining the temperature of water entering the economizer section 142 above the salt freezing temperature, and the temperature of salt leaving the MSSG at the lowest possible level for safe operation above freezing. To that effect, the system 100 includes a recirculation line 170. The recirculation line 170 is configured around the economizer section 142 to recirculate the heated water to an inlet 142a of the economizer section 142. The recirculation of the heated water in the recirculation line 170 may be done by a pump of suitable capacity. In this way, the feedwater temperature can be decreased, but the inlet temperature to the economizer section 142 can be kept to the desired level to avoid risk of salt freeze, by appropriately setting the amount of recirculated water. The result is a net increase of the heat load on the economizer section 142. In one embodiment, as shown in FIG. 2, the recirculation line 170 is configured from an outlet 142b of the economizer section 142 to the inlet 142a of the economizer section 142. In another embodiment, as shown in FIG. 3, the recirculation line 170 is configured from the evaporator section 144 to the inlet 142a of the economizer section 142. In yet further embodiment, as shown in FIG. 4, the evaporator section 144 may also include a steam drum 146 and in that embodiment the recirculation line 170 may be configured from the steam drum 146 to the inlet 142a of the economizer section 142.

Figures 5A, 5B:
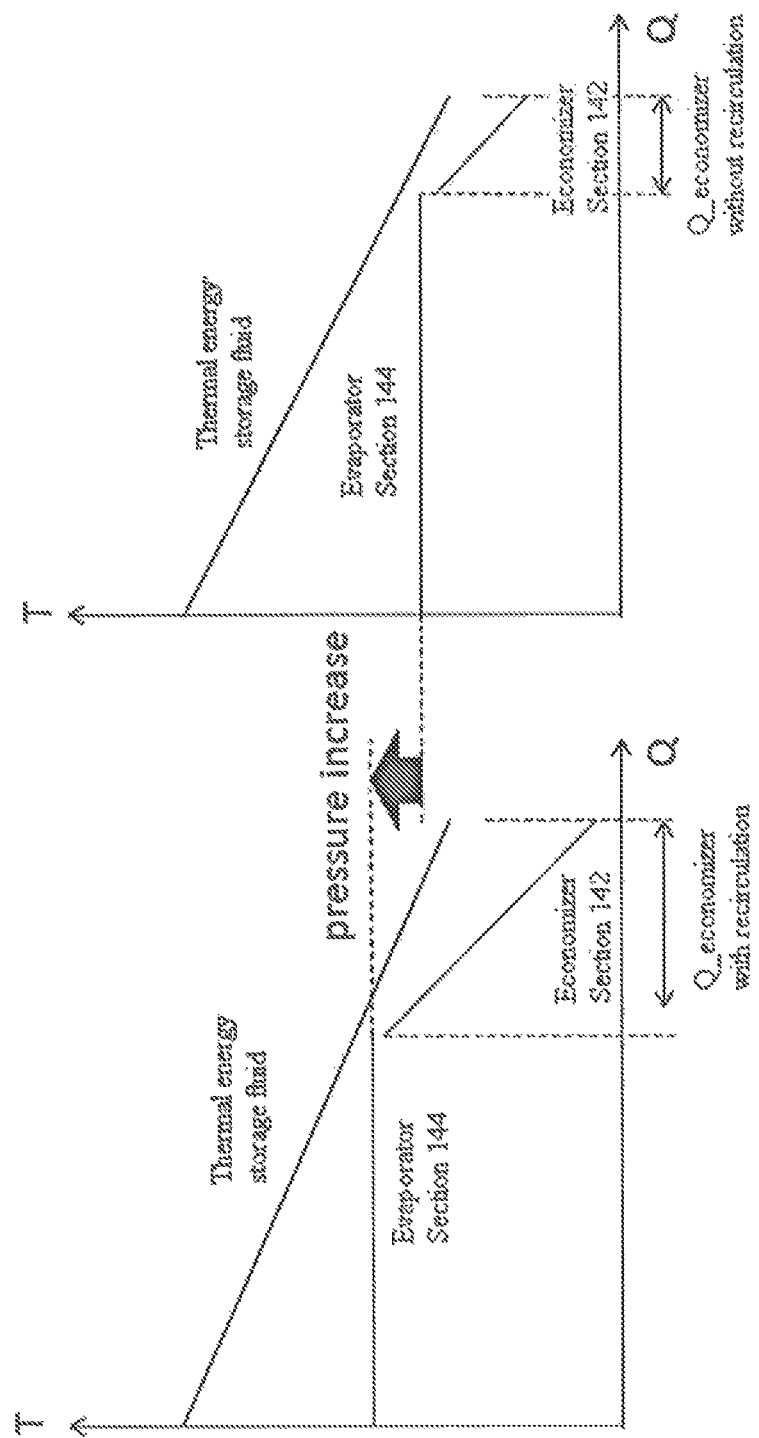
FIGS. 5A and 5B respectively illustrate graphical representations of improvement of the present system with respect to a conventional system.

These said arrangements of the recirculation lines 170 of FIGS. 2, 3 and 4 allow increasing the pressure range of the variable pressure steam in the steam generator arrangement 140, in turn increasing the efficiency of the steam cycle while maintaining the temperature of the thermal energy storage fluid at an inlet 144a of the evaporator section 144 and at the outlet 142b of the economizer section 142, and the feedwater temperature to the economizer section 142 at desired values. FIGS. 5A and 5B, respectively, depict graphical representations of T-Q diagram illustrating improvement of the present invention (FIG. 5A) with respect to the conventional one (FIG. 5B). Increasing the recirculated heated water while decreasing the feedwater temperature to the economizer section 142 reduces the slope of the water heating line, this pinches the thermal storage fluid (molten salt) line in a point corresponding to a higher evaporation pressure.

An additional effect of such recirculation line 170 around the economizer section 142 is that the water entering the economizer section 142 may be kept at desired level, i.e. 240° C., at full load operation of the system 100, by mixing the water with an appropriate amount of the recirculated hot water.

In one further embodiment of the present disclosure, in addition to the recirculation line 170, the system 100 further includes a bypass line 180 configured to bypass the economizer section 142 to supply the water from the feedwater supply 116 directly to the evaporator section 144, as shown in FIGS. 2, 3 and 4. The working conditions for the recirculation and bypass lines 170 and 180 may be explained in conjunction with other FIGS. 1 and 5A-B in addition to FIGS. 2, 3 and 4. Depending upon the operating load conditions (full and part loads), the recirculation and bypass lines 170 and 180 may be selected for operation.

For example, the bypass line 180 may be important during the part load condition. Generally, at full load condition, the temperature of the thermal storage fluid (molten salt) exiting from the economizer section 142 corresponds to the temperature of the second storage tank 124 (cold tank) of about 290° C. Therefore, at part load condition, the temperature of the thermal storage fluid (molten salt) may generally tend to decrease below 290° C. The recirculation line 170 may be adjusted to increase the water inlet temperature to the economizer section 142 to above 240° C., thus controlling the outlet temperature of the thermal storage fluid (molten salt) at 290° C. However, the required recirculation flow may increase and may soon be limited by the maximum capability of the recirculation line 170, typically limited by the capacity of the pump in the recirculation line 170. When this point is reached, the outlet temperature of the thermal storage fluid (molten salt) may be required to slide below 290° C. At lower part load condition, if the temperature of the thermal storage fluid (molten salt) reaches a level, below which there is a risk of freezing, provision may to be taken to overcome thereto. By installing the bypass line 180, part of the water from the feedwater supply 116 may be directly sent to the evaporator section 144, instead of being sent to the economizer section 142, reducing the heat load on the economizer section 142 and avoiding the thermal storage fluid (molten salt) to become too cold while being sent to the second storage tank 124 to be stored. This enables higher efficiency of the system 100 at the part load condition.

In addition to above, the recirculation and bypass lines 170, 180 may also allow to extend 'sliding pressure range' of the steam generator arrangement 140. 'Sliding pressure' means that when the water flow decreases, the steam pressure is decreased proportionally. Lowering the pressure also has the effect of lowering the thermal storage fluid (molten salt) outlet temperature, as it lowers the evaporation temperature in the evaporator section 144 and hence leads to a lower water inlet temperature already at the inlet 142a of the economizer section 142. The bypass line 180 may be used to maintain the thermal storage fluid (molten salt) outlet temperature high and allows operation in the 'sliding pressure' to much lower loads than without bypass line 180, while avoiding a drop of the thermal storage fluid (molten salt) outlet temperature from its design value (generally, about 290° C.). When operating the steam generator arrangement 140 in sliding pressure for the part load condition, the multistage steam turbine 130 may be operated with a valve wide open (turbine is a volumetric machine following sliding pressure characteristics). This significantly increases efficiency of the turbine cycle, compared to an operation where the turbine needs to maintain a higher pressure in the steam generator arrangement and therefore needs to throttle the pressure with the turbine inlet valve.

The system 100 of the present disclosure is advantageous in various scopes such as described above. Apart from above advantageous features described in the disclosure in various embodiment regarding capability of the present invention to increase steam pressure in a steam generator arrangement while preventing freezing of the molten salt improving the efficiency of solar thermal power system, the present invention is also capable of being applicable to steam generator technologies and embodiments including where the economizer, evaporator and superheater sections are separated in dedicated components, assembled in series or parallel, or all the three sections combined in one single component.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A method of operating a solar thermal power system, comprising:
    providing a solar receiver;
    with a thermal energy storage arrangement, circulating a thermal energy storage fluid through the solar receiver to store thermal energy;
    operating a multistage steam turbine on variable pressure steam generated from feedwater supplied from a feedwater supply via the thermal energy storage fluid;
    providing a steam generator arrangement comprising an economizer section, an evaporator section and a superheater section that utilizes heat of the thermal energy storage fluid at an entrance of the evaporator section to generate and supply the variable pressure steam to the superheater section and further to the multistage steam turbine;
    providing a recirculation line around the economizer section, the recirculation line having an inlet and an outlet, the inlet of the recirculation line disposed at one of an outlet from the economizer section or the evaporator section, the outlet of the recirculation line disposed at an inlet of the feedwater to the economizer, and the recirculation line configured directly between the inlet and the outlet of the recirculation line such that all heated water directed into the inlet of the recirculation line is discharged at the outlet of the recirculation line;
    adjusting recirculation through the recirculation line to increase efficiency of the thermal power system by:
        increasing flow of heated water through the recirculation line to the economizer white reducing temperature of the feedwater supplied from the feedwater supply to the economizer; and maintaining temperature of the thermal energy storage fluid leaving the economizer at a lowest level for safe operation above a freezing temperature of the thermal energy storage fluid.

2. The method of claim 1, wherein the inlet of the recirculation line is configured from the outlet of the economizer section and the outlet of the recirculation line is configured at the inlet of the economizer section.

3. The method of claim 1, wherein the inlet of the recirculation line is configured from the evaporator section and the outlet of the recirculation line is configured at the inlet of the economizer section.

4. The method of claim 1, wherein the evaporator section comprises a steam drum, and the inlet of the recirculation line is configured from the steam drum.

5. The method of claim 1, further comprising bypassing the economizer section to supply the water from the feedwater supply directly to the evaporator section.

6. The method of claim 1, further comprising reheating steam with a reheat assembly configured to the steam generator.

7. The method of claim 1, further comprising:
storing the hot thermal energy storage fluid in a first storage tank of the thermal energy storage arrangement; to store the thermal energy storage fluid heated by the solar receiver;
storing the cold thermal energy storage fluid in a second storage tank; and
supplying the cold thermal energy storage fluid from the second storage tank to the solar receiver to be reheated.

* * * * *